United States Patent
Palaoro

(10) Patent No.: US 9,493,044 B2
(45) Date of Patent: Nov. 15, 2016

(54) TIRE VALVE AND MOLDING SEAL FOR A TIRE VALVE

(75) Inventor: Renato Palaoro, Heidenheim (DE)

(73) Assignee: Alligator Ventilfabrik GmbH, Giengen (DE)

( * ) Notice: Subject to any disclaimer, the term of this patent is extended or adjusted under 35 U.S.C. 154(b) by 691 days.

(21) Appl. No.: 11/813,214

(22) PCT Filed: Dec. 28, 2005

(86) PCT No.: PCT/EP2005/014083
§ 371 (c)(1),
(2), (4) Date: Aug. 17, 2007

(87) PCT Pub. No.: WO2006/072437
PCT Pub. Date: Jul. 13, 2006

(65) Prior Publication Data
US 2008/0142088 A1    Jun. 19, 2008

(30) Foreign Application Priority Data
Dec. 30, 2004 (DE) .................... 20 2004 020 121 U

(51) Int. Cl.
*F16K 15/20* (2006.01)
*B60C 29/02* (2006.01)

(52) U.S. Cl.
CPC .......... *B60C 29/02* (2013.01); *Y10T 137/3584* (2015.04); *Y10T 137/3786* (2015.04)

(58) Field of Classification Search
CPC .................................................... B60C 29/02
USPC ........ 137/223, 234.5; 152/427, 428, DIG. 7, 152/DIG. 11, 429; 277/646, 586, 587, 630, 277/637, 641, 606, 608, 609, 616, 619, 644
See application file for complete search history.

(56) References Cited

U.S. PATENT DOCUMENTS 1,274,237 A * 7/1918 Boryszewski ................ 152/427
1,419,471 A * 6/1922 Reynolds ...................... 137/223
(Continued)

FOREIGN PATENT DOCUMENTS

DE   200 15 467   1/2001
FR   2681396 A1 * 3/1993
(Continued)

OTHER PUBLICATIONS

Parker Hannifin Corporation, Parker Oring Handbook, 2001, p. 4-20.*

*Primary Examiner* — Craig J Price
(74) *Attorney, Agent, or Firm* — Bachman & LaPointe, PC

(57) ABSTRACT

A tire valve having a valve body engaging in a rim bore of a rim, in particular vehicle rim, which valve body forms a lower valve body section arranged on a side of the rim, in particular in the rim interior, in the assembled state, and an upper valve body section projecting from the rim bore, and in the region of the upper valve body section is designed to cooperate with a union nut, wherein the lower valve body section forms a ring shoulder offering an abutment for a flat edge section of the rim bore, and in which a ring groove which is open to the edge section is molded, and against which the edge section can be gripped by tightening the union nut, and a molded seal made from resilient material is provided to seal the rim bore with respect to the valve body, so that in the assembled and gripped state, an annular chamber section of the molded seal engages in the ring groove and rests in sealing manner on the edge section of the rim bore.

9 Claims, 1 Drawing Sheet

(56) References Cited

U.S. PATENT DOCUMENTS

| | | | | |
|---|---|---|---|---|
| 1,993,227 | A * | 3/1935 | Preston | 137/223 |
| 2,657,825 | A * | 11/1953 | Erickson | 277/608 |
| 2,731,065 | A * | 1/1956 | Powers | 152/427 |
| 2,783,068 | A * | 2/1957 | Cornish et al. | 277/582 |
| 2,813,568 | A * | 11/1957 | Kilmarx, Jr. | 152/427 |
| 2,841,429 | A * | 7/1958 | McCuistion | 277/402 |
| 2,874,749 | A * | 2/1959 | Winfield | 152/427 |
| 3,019,832 | A * | 2/1962 | Williams | 152/427 |
| 3,087,370 | A * | 4/1963 | Iaia | 277/641 |
| 3,149,845 | A * | 9/1964 | Knox | 277/641 |
| 3,186,739 | A * | 6/1965 | Mahoff et al. | 277/625 |
| 3,860,250 | A * | 1/1975 | Lundquist | 277/589 |
| 3,915,073 | A * | 10/1975 | Burda | 277/345 |
| 4,042,020 | A * | 8/1977 | Wellstein | 277/606 |
| 4,294,301 | A * | 10/1981 | Lutz | 152/427 |
| 4,411,302 | A * | 10/1983 | Kuypers | 137/223 |
| 4,523,765 | A * | 6/1985 | Heidemann | 277/336 |
| 4,538,658 | A * | 9/1985 | Earley | 152/427 |
| 4,577,870 | A * | 3/1986 | Scott et al. | 277/587 |
| 4,718,639 | A * | 1/1988 | Sherwood et al. | 137/223 |
| 4,739,813 | A * | 4/1988 | Pagani | 152/427 |
| 5,211,782 | A * | 5/1993 | Thelen | 152/427 |
| 6,279,671 | B1 * | 8/2001 | Panigrahi et al. | 277/587 |
| 6,407,662 | B1 * | 6/2002 | Gomez De Sebastian | 340/447 |
| 6,588,446 | B2 * | 7/2003 | Reinhardt | 137/223 |
| 6,912,897 | B2 * | 7/2005 | Luce | 73/146.8 |
| 6,966,331 | B2 * | 11/2005 | Simmons et al. | 137/232 |
| 7,234,485 | B2 * | 6/2007 | Yamamoto et al. | 137/223 |
| 7,257,998 | B2 * | 8/2007 | Luce | 73/146.8 |
| 7,454,965 | B2 * | 11/2008 | Blossfeld et al. | 73/146 |
| 2006/0237062 | A1 * | 10/2006 | Matsuzawa et al. | 137/223 |

FOREIGN PATENT DOCUMENTS

| | | | |
|---|---|---|---|
| FR | 2681396 | * | 11/1993 |
| GB | 827 524 | | 2/1960 |
| JP | 58-149202 | | 10/1983 |
| JP | 2001 287521 | | 4/2002 |

* cited by examiner

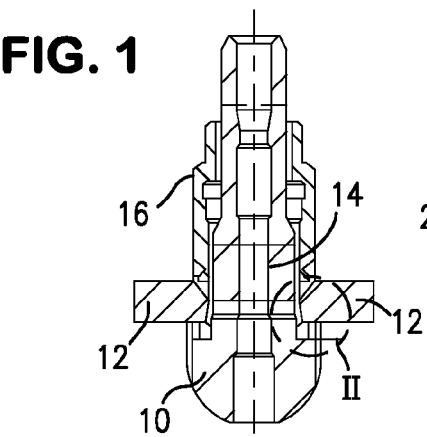
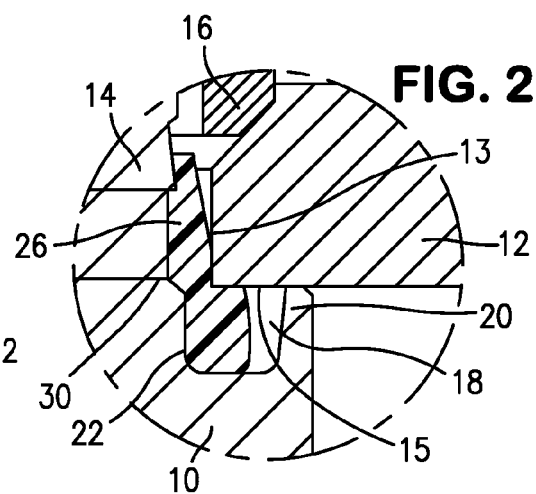
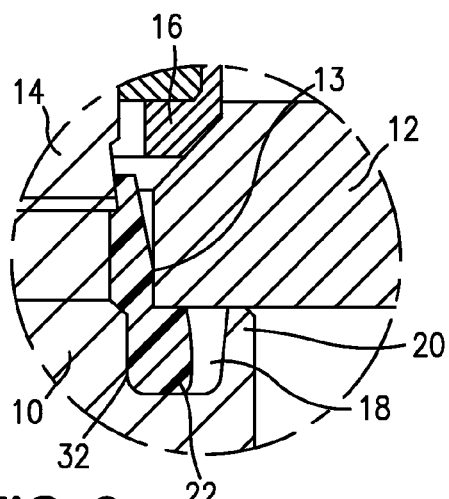
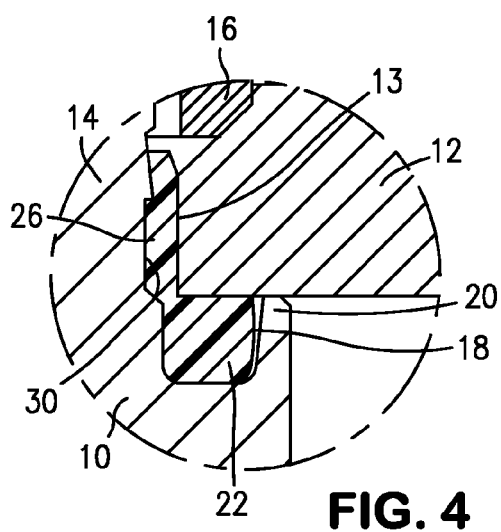
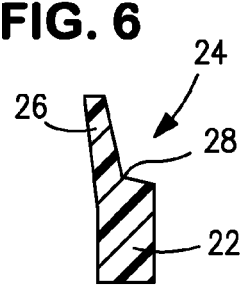
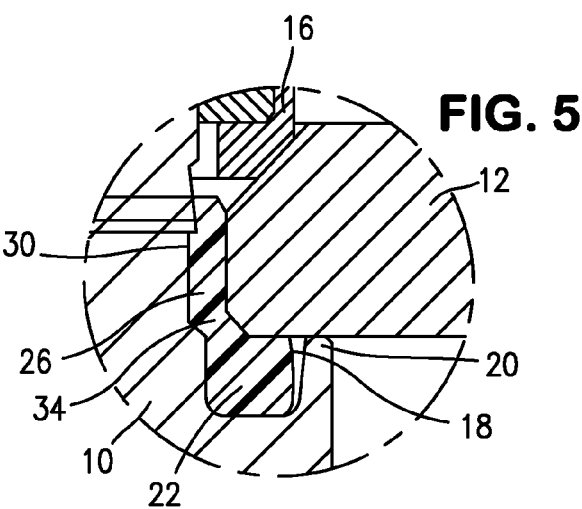

TIRE VALVE AND MOLDING SEAL FOR A TIRE VALVE

BACKGROUND OF THE INVENTION

The present invention relates to a tire valve, in particular gas and/or air tire valve, according to the preamble of the main claim, and a moulded seal which is suitable and provided in particular for use in such a valve.

Various approaches are known from the state of the art for sealing against air loss between an air tire valve and the valve bore (below also: rim bore) surrounding the air tire valve in the air tire rim. Firstly, so-called shoulder or flat seals exist, secondly O-ring seals are used.

However, both solutions, considered in each case in themselves, are disadvantageous technically: A shoulder or flat seal typically consisting of a flat rubber ring and optionally provided with a shoulder section, places relatively small demands on the evenness of the support surface (that is, the outer-lying flat edge section of the rim bore) and on the aperture tolerances of this rim bore, since the large rubber volume of such seals compensates deviations in simple manner. However, it is disadvantageous that during installation of valves using such seals, (low) torque limits may not be exceeded, this would lead to the destruction of the seal. Since in addition the sealing elements are deformed under pressure, very low release moments for the union nut securing the valve are usually produced in disadvantageous manner.

On the other hand, the known O-ring seals facilitate very much higher tightening moments, since the union nut engages directly on the edge section of the rim bore and in this respect a metal-metal contact exists; correspondingly high release moments can advantageously be achieved for the securing union nut. On the other hand, it is disadvantageous that such an O-ring seal places very high requirements on the evenness of the support surface in the rim bore edge region and the bore tolerances themselves, so that here in some cases considerable additional expense is necessary for manufacture and assembly. The object of the present invention is therefore to provide an improved air seal between a tire valve and the tire rim surrounding it, wherein this seal should place firstly, fewer requirements on the surface condition or evenness of the rim surface in the rim bore edge region, but secondly high tightening moments should be ensured for the union nut securing the valve.

SUMMARY OF THE INVENTION

The object is achieved by providing a tire valve having a valve body engaging in a rim bore of a rim, in particular vehicle rim, which valve body forms a lower valve body section arranged on a side of the rim, in particular in the rim interior, in the assembled state, and an upper valve body section projecting from the rim bore, and in the region of the upper valve body section is designed to cooperate with a union nut, characterised in that the lower valve body section forms a ring shoulder offering an abutment for a flat edge section of the rim bore, and in which a ring groove which is open to the edge section is moulded, and against which the edge section can be gripped by tightening the union nut, and a moulded seal made from resilient material is provided to seal the rim bore with respect to the valve body, so that in the assembled and gripped state, an annular chamber section of the moulded seal engages in the ring groove and rests in sealing manner on the edge section of the rim bore, and a preferably hollow-cylindrical vertical section of the moulded seal sitting on the chamber section engages around the upper valve body section and cooperates in sealing manner with an annular end-face of the rim bore and a moulded seal having an annular chamber section and an in particular hollow-cylindrical vertical section sitting integrally thereon and made from a resilient material suitable for valves, in particular rubber material, wherein a transition region between the chamber section and the vertical section forms an outer-lying ring shoulder, and the chamber section and the vertical section merge into one another smoothly on the inner side.

In advantageous manner according to the invention, the favourable properties of both sealing methods described in the introduction are combined by the present solution, while the particular disadvantages may be effectively avoided: Hence, the ring shoulder formed on the lower valve body section ensures that, together with the union nut, a metal-metal connection may be realised in the gripped state with high tightening and release moment. At the same time, the sealing effect of the chamber section of the moulded seal of the invention sitting in sealing manner in the chamber formed by the ring groove in the lower valve body section and the edge section of the rim bore in conjunction with the vertical section sitting integrally on the chamber section, ensures that both the flat edge section in the region of the rim bore and the annular end-face of the bore are effectively surrounded by sealing material and even high bore tolerances and surface unevenness do not disadvantageously impair the sealing capacity facilitated not least by the considerable rubber volume and the large rubber contact surface.

It has thus additionally been proved to be advantageous that such a moulded seal forming a graduated (ring shoulder-like) transition region is suitable, even particularly effective, for sealing rim bores having chamfering; in the assembled and gripped state, this ring chamfer would namely engage on the ring shoulder of the moulded seal or be pressed into the latter, so that, almost independently of a particular chamfer width (or, for variations occurring in practice), effective sealing may take place.

In this context, it is thus also advantageous when on the upper valve body section in the region of the valve bore (rim bore), an annular shallow groove is provided, into which in the gripped state, the rubber material of the vertical section is pressed.

The moulded seal itself is advantageously characterised by an outwardly directed graduation (to form the outer-lying ring shoulder), whereas lying on the inside a homogeneous transition between vertical section and chamber section is realised. The inner or outer region may be suitably designed to be conically tapering, in particular in the region of the vertical section, and it is additionally advantageous when the annular sealing surface formed by the outer-lying ring shoulder, relative to the surface described by the rim bore, does not run parallel (that is purely horizontally), but is slightly tilted with respect to the latter.

Whereas usually within the framework of the invention, the lower valve body section with the ring shoulder formed by it or the chamber for the moulded seal is arranged in a rim interior, it is nevertheless also encompassed by the present invention to reverse the securing principle of the invention: In this case, a lower valve body section would sit outside of the rim (optionally with the further valve elements), form accordingly the annular chamber section for the moulded seal from the outside onto the rim, whereas the union nut then cooperates from the rim interior with the upper valve body section or the rim in the region of the rim bore or valve bore.

As a result of the present invention, favourable tolerance and surface properties of the seal are combined with high tightening and release moments for securing the union nut, so that in particular also areas of application with greater manufacturing tolerances are developed for the present invention.

BRIEF DESCRIPTION OF THE DRAWINGS

Further advantages, features and details can be seen from the following description of preferred exemplary embodiments and using the drawings; these show in FIG. 1: a schematic sectional view of an air tire valve assembled in a vehicle rim with non-chamfered valve bore;

FIG. 2: an enlarged detailed view of the section II in FIG. 1 to illustrate the installation and sealing position of the moulded seal in the arrangement of FIG. 1;

FIG. 3: a schematic representation analogous to FIG. 2, but with chamfer in the lower valve or rim bore region in the support region of the seal;

FIG. 4: a representation analogous to FIG. 2, but with valve bore which is enlarged with respect to the arrangement of FIGS. 1 to 3;

FIG. 5: a representation analogous to FIG. 3, but enlarged valve bore and enlarged chamfer, and FIG. 6: a cross-sectional view of the moulded seal for use in the exemplary embodiments described.

DETAILED DESCRIPTION

FIG. 1 shows in the schematic sectional view, the tire valve of the invention as air tire valve according to a first, preferred embodiment of the present invention. More precisely, a lower valve body 10 sits in a rim interior of a vehicle rim 12 (the valve or rim bore region of this rim is shown by the reference number 12), and an upper valve body section 14 having an annular shallow groove 30 extends through the rim bore thus described and offers in otherwise known manner, the possibility for accessing the valve. A union nut 16, which, see in particular the detailed drawings of the cutout II in FIG. 1, engages on a cross-sectionally bevelled (chamfered) region of the valve bore in gripped state (that is, assembly state), is placed on an outer thread of the upper valve body section 14.

The lower valve body section 10 has in the contact region with the valve or rim bore region 12 (which has an annular end face 13 and an under surface in the form of a flat edge 15), an annular ring groove 18 such that on the edge side in the lower valve body section, a ring shoulder 20 is formed, which offers a support or abutment for the rim bore region 12. At the same time, between an under surface of the rim bore region 15 and the ring groove, an incompletely closed, annular chamber is formed, in which a correspondingly annular chamber section 22 of a moulded seal 24, shown as a non-deformed cross-section in FIG. 6, engages. The chamber section 22 of the moulded seal thus has dimensions so that it does not completely fill the ring groove 18, but in particular also still leaves space for (for example thermally related) expansion effects.

As shown in the detailed views of FIGS. 2 to 5, the annular chamber section 22 of the moulded seal 24 merges into a vertical section 26, which sits integrally on the chamber section 22, and forms a transition-free homogeneous, hollow-cylindrical or slightly conically tapered inner wall on the inner side of the moulded seal shown on the left side in FIG. 6. A step in the form of a ring shoulder-like transition region 28 is formed between the annular chamber section and the vertical section in the outwardly placed region.

FIGS. 2 to 5 illustrate various assembly states of the annular moulded seal in the arrangement according to FIG. 1 for various valve or rim bore diameters and more or less pronounced chamfers 32, 34 in the lower edge region of the valve bore: Hence FIG. 2 illustrates in direct comparison with FIG. 4, how with a relatively narrow valve aperture (FIG. 2), the bore edge of the valve bore region compresses the moulded seal to a greater extent than for a relatively wider valve aperture (FIG. 4). However, in each situation the ring groove 18 is not completely filled by the annular chamber section 22 of the moulded seal.

As shown in FIG. 6, a flat, annular sealing surface of the ring shoulder 28 forms an angle not equal to 90° with an outer wall of the chamber section 22 and/or an outer wall of the vertical section 26. Further, the sealing surface of the ring shoulder 28 can be tilted at an angle between 10° and 20° relative to the flat edge section 13 of the rim bore 12.

The present invention is not restricted to the exemplary embodiments described, hence the present invention is suitable not only for vehicle rims and air valves, but is suitable in principle for any gas valves or the like in cooperation with a rim, from the inside or from the outside.

The invention claimed is:

1. A tire valve comprising a valve body engaging in a rim bore of a vehicle rim, the valve body having a lower valve body section arranged on an interior surface of the vehicle rim and an upper valve body section projecting from the rim bore, wherein the upper valve body section is designed to cooperate with a union nut, the lower valve body section has a ring shoulder for metal-to-metal abutment with a flat edge section of the rim bore, the ring shoulder has a ring groove which is open to the flat edge section and against which the flat edge section can be gripped by tightening the union nut, wherein a moulded seal made from resilient material is provided to seal the rim bore with respect to the valve body, so that in an assembled and gripped state, the ring shoulder of the lower valve body section is in metal-to-metal abutment with the flat edge section of the rim bore, an annular chamber section of the moulded seal engages in the ring groove and rests in sealing manner on the edge section of the rim bore, wherein the ring groove is not completely filled by the annular chamber section of the moulded seal such that a gap is defined between a radially outer surface of the annular chamber section and the ring shoulder, and a hollow-cylindrical vertical section of the moulded seal sitting on the chamber section engages around the upper valve body section and cooperates in sealing manner with an annular end-face of the rim bore.

2. A tire valve according to claim 1, wherein the upper valve body section has an annular shallow groove into which the vertical section of the moulded seal engages in the assembled and gripped state.

3. A tire valve according to claim 1, wherein the rim bore has in a transition region between the flat edge section and the end-face, a chamfer, which in the assembled and gripped state, is pressed onto a ring shoulder-like transition region between the chamber section and the vertical section of the moulded seal.

4. Moulded seal for use in the tire valve according to claim 1 wherein the annular chamber section and the hollow-cylindrical vertical section sitting integrally on the chamber section are made from a resilient rubber material, wherein a transition region between the chamber section and the vertical section forms a step on the outer side, and the chamber section and the vertical section merge into one another smoothly on the inner side.

5. Moulded seal according to claim 4, wherein the moulded seal is designed so that the moulded seal tapers like a cone on the inner side in the direction of the vertical section and/or in the region of the vertical section.

6. Moulded seal according to claim 4, wherein the moulded seal is designed so that the moulded seal tapers like a cone on the outer side in the region of the vertical section.

7. Moulded seal according to claim 4, wherein a flat, annular sealing surface of the ring shoulder forms an angle not equal to 90° with an outer wall of the chamber section and/or an outer wall of the vertical section.

8. Moulded seal according to claim 7, wherein the sealing surface is tilted by an angle between 10° and 20° relative to the flat edge section of the rim bore.

9. Moulded seal according to claim 1, wherein the ring shoulder defines the ring groove having a radially inwardly facing wall, and wherein, in the assembled and gripped state, the radailly outer surface of the annular chamber section does not contact the radailly inwardly facing wall.

\* \* \* \* \*